(12) United States Patent
Lee et al.

(10) Patent No.: US 12,065,951 B2
(45) Date of Patent: Aug. 20, 2024

(54) APPARATUS AND METHOD FOR ASSEMBLING AN ENGINE

(71) Applicants: HYUNDAI MOTOR COMPANY, Seoul (KR); KIA CORPORATION, Seoul (KR)

(72) Inventors: Seung Yeop Lee, Ulsan (KR); Chul Hyun Jang, Ulsan (KR); Woojong Kim, Ulsan (KR); Young Seok Lee, Ulsan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 169 days.

(21) Appl. No.: 17/900,035

(22) Filed: Aug. 31, 2022

(65) Prior Publication Data
US 2023/0220790 A1    Jul. 13, 2023

(30) Foreign Application Priority Data
Jan. 11, 2022  (KR) .................. 10-2022-0003814

(51) Int. Cl.
| | | |
|---|---|---|
| F01L 1/02 | (2006.01) | |
| F01L 1/46 | (2006.01) | |
| F02B 67/06 | (2006.01) | |
| F16H 7/12 | (2006.01) | |
| F16H 7/08 | (2006.01) | |

(52) U.S. Cl.
CPC .............. F01L 1/024 (2013.01); F01L 1/46 (2013.01); F02B 67/06 (2013.01); F16H 7/12 (2013.01); *F01L 2303/01* (2020.05); *F01L 2820/042* (2013.01); *F16H 2007/0842* (2013.01)

(58) Field of Classification Search
CPC ......... F01L 1/024; F01L 1/46; F01L 2250/04; F01L 2303/01; F01L 2820/042; F02B 67/06; F16H 2007/0842; F16H 7/12
USPC ....................................................... 123/90.31
See application file for complete search history.

(56) References Cited

U.S. PATENT DOCUMENTS 4,802,883 A  *  2/1989  Tominaga .................. F16H 7/24
474/101

FOREIGN PATENT DOCUMENTS

| JP | H05231173 A | * | 9/1993 | |
| JP | H0774605 B2 | * | 8/1995 | .............. F01L 1/024 |
| JP | H0792000 B2 | * | 10/1995 | .............. F02B 67/06 |

(Continued)

*Primary Examiner* — Jorge L Leon, Jr.
(74) *Attorney, Agent, or Firm* — Lempia Summerfield Katz LLC

(57) ABSTRACT

An apparatus for assembling an engine includes an engine jig configured to load the engine on which a pump sprocket, a cam sprocket, an auto tensioner, and an engine belt are preliminarily mounted. The apparatus includes: a pump sprocket fastening unit disposed on a first die disposed on a first side of the engine jig and configured to clamp and fully fasten the pump sprocket in order to fixedly mount the pump sprocket preliminarily mounted to the engine; a cam sprocket fastening unit disposed on the first die and configured to clamp, rotate, and fully fasten the cam sprocket in order to fixedly mount the cam sprocket preliminarily mounted to the engine; and an auto tensioner fastening unit disposed on the first die, and configured to clamp, rotate, and fully fasten the auto tensioner in order to fixedly mount the auto tensioner preliminarily mounted to the engine.

19 Claims, 8 Drawing Sheets

(56) References Cited

FOREIGN PATENT DOCUMENTS

JP 2007023804 A * 2/2007 .............. F01L 1/024

* cited by examiner

APPARATUS AND METHOD FOR ASSEMBLING AN ENGINE

CROSS-REFERENCE TO RELATED APPLICATION

This application claims priority to and the benefit of Korean Patent Application No. 10-2022-0003814 filed in the Korean Intellectual Property Office on Jan. 11, 2022, the entire contents of which are incorporated herein by reference.

BACKGROUND

(a) Field

The present disclosure relates to an apparatus and a method for assembling an engine. More particularly, the present disclosure relates to an apparatus and a method for assembling an engine capable of automating assembly of a pump sprocket, a cam sprocket, an auto tensioner, an engine belt, and the like, to the engine.

(b) Description of the Related Art

In general, in order to produce a single vehicle, it goes through various processes are employed from selection of materials to mass production.

For such processes, efforts are being made to produce many products in a short time by introducing an automation system in line with the trend of factory automation.

On the other hand, the engine belt used in the engine module of the vehicle is a power transmission means to drive engine parts and accessories, such as a cam sprocket and a water pump, by the power of the crank sprocket when the engine is driven.

The tension of the engine belt should be maintained constant during the long-term operation of the engine.

For such a purpose, an auto tensioner, that is, a tension adjusting device for adjusting the tension of the engine belt, is typically employed at the engine belt side located in the longest section between the sprockets.

Since the auto tensioner for the engine belt keeps the engine belt in a tension state, the desired best engine condition may be maintained by preventing the engine power loss against the lapse of time.

Typically, the engines to which the auto tensioner is applied are manually assembled by workers using a manual jig.

The assembly of the engine is briefly summarized as follows.

After the engine is mounted on a fixing jig and a fixing pin of the auto tensioner is removed, a cam sprocket is bolted to the engine using a cam sprocket jig.

Then, the auto tensioner is fully fastened to the engine, and the crank sprocket is bolted to the engine using the crank sprocket jig.

While rotating the crankshaft installed in the engine, the position of the auto tensioner is checked.

At this time, if necessary, the torque of the auto tensioner bolt may be released, and the above operation may be repeated.

Therefore, it may be understood that it is advantageous to research and develop a technology capable of automatically assembling of the engine to which the auto tensioner is applied.

The above information disclosed in this Background section is only for enhancement of understanding of the background of the present disclosure, and therefore it may contain information that does not form the prior art that is already known to a person of ordinary skill in the art.

SUMMARY

The present disclosure provides an apparatus and a method for assembling an engine capable of automating an engine assembly process to improve productivity.

An apparatus for assembling an engine according to an embodiment includes an engine jig configured to load the engine. In particular, a pump sprocket, a cam sprocket, an auto tensioner, and an engine belt are preliminarily mounted on the engine. The apparatus for assembling an engine further includes: a pump sprocket fastening unit disposed on a first die disposed on a first side of the engine jig. The pump sprocket fastening unit is configured to clamp and fully fasten the pump sprocket in order to fixedly mount the pump sprocket preliminarily mounted to the engine. The apparatus further includes: a cam sprocket fastening unit which is disposed on the first die and configured to clamp, rotate, and fully fasten the cam sprocket in order to fixedly mount the cam sprocket preliminarily mounted to the engine. The apparatus further includes an auto tensioner fastening unit which is disposed on the first die and configured to clamp, rotate, and fully fasten the auto tensioner in order to fixedly mount the auto tensioner preliminarily mounted to the engine.

The pump sprocket fastening unit may include a slot head mounted on a first housing fixed to the first die and configured to fix the pump sprocket by being inserted into a slot formed on the pump sprocket. The pump sprocket fastening unit may include a pump sprocket nut runner fixed to the first die and configured to engage a bolt to a bolt hole formed in a central portion of the pump sprocket.

The slot head may be mounted on the first housing through a first cushion member. The first cushion member may be compressed when connected to the pump sprocket.

The cam sprocket fastening unit may include a tool head mounted on a second housing fixed to the first die and capable of being inserted into a plurality of tool holes formed in the cam sprocket at a preset interval, and a cam sprocket nut runner configured to engage a bolt to a plurality of fastening holes formed alternatingly with respect to the plurality of tool holes.

The tool head may be rotatably mounted on the second housing through a ball bearing.

The auto tensioner fastening unit may include an eccentric portion mounted on a third housing fixed to the first die and configured to contact an exterior surface of an eccentric pin of the auto tensioner to eccentrically moves the eccentric pin, and an auto tensioner nut runner configured to engage a bolt to the eccentrically moved auto tensioner.

The eccentric portion may be connected to a gear portion operated by a cylinder, and an operation amount of the eccentric portion may be adjusted by a stopper configured on a frontal end of the gear portion.

The gear portion may include a pinion gear engaged to the eccentric portion, and a rack gear connected to the pinion gear and an operation shaft of the cylinder to rotate the pinion gear by the cylinder.

An apparatus for assembling an engine according to an embodiment may further include a cam sprocket locking unit disposed adjacent to the cam sprocket fastening unit and configured to lock the cam sprocket loaded to the cam sprocket fastening unit.

A cam sprocket locking unit may be mounted on the first die and configured to pressurize and fix the cam sprocket.

An apparatus for assembling an engine according to an embodiment may further include a fixing plate configured on a second die disposed on a second side of the engine jig. The fixing plate is configured to fix the engine in a vertical direction when the engine is loaded to the engine jig.

An apparatus for assembling an engine according to an embodiment may further include a phase adjustment unit disposed below the fixing plate and mounted on the second die. The phase adjustment unit is configured to adjust the phase of crankshaft disposed on a lower side of the engine.

The phase adjustment unit may include a crank head rotatably mounted on a third housing fixed to the second die through rotation shaft, and connected to a crank pin of the crankshaft. The phase adjustment unit may further include a second cushion member fitted with the rotation shaft while being connected to the crank head, and configured to be compressed when the crank head is connected to the crankshaft. The phase adjustment unit may further include a position detection sensor mounted on the rotation shaft and configured to check a position of the crankshaft.

A pin receiving recess configured to receive the crank pin may be formed in the crank head.

An exemplary method of assembling an engine includes assembling a pump sprocket, a cam sprocket, an auto tensioner, and engine belt to the engine. In particular, the method includes loading the engine on an engine jig. Here, the engine is preliminarily mounted with the pump sprocket, the cam sprocket, the auto tensioner, and the engine belt. The method further includes: operating a first die toward the engine jig to connect a pump sprocket fastening unit to the pump sprocket, connect a cam sprocket fastening unit to the cam sprocket, and connect an auto tensioner fastening unit to the auto tensioner. The method further includes: fully fastening the pump sprocket by the pump sprocket fastening unit, fully fastening the cam sprocket by the cam sprocket fastening unit, and fully fastening the auto tensioner by the auto tensioner fastening unit.

The fully fastening of the pump sprocket may include fixing the pump sprocket by insertion of a slot head of the pump sprocket fastening unit into a slot of the pump sprocket, while a first cushion member of the pump sprocket fastening unit is being compressed, and engaging a bolt to a bolt hole of the pump sprocket by a pump sprocket nut runner.

The fully fastening of the cam sprocket may include rotating the cam sprocket to a preset angle by a tool head of the cam sprocket fastening unit inserted into a tool hole of the cam sprocket, and engaging a bolt to a fastening hole of the cam sprocket by a cam sprocket nut runner.

The fully fastening of the auto tensioner may include eccentrically moving the eccentric pin by a preset angle by an exterior surface of an eccentric pin of the auto tensioner contacting an eccentric portion of the auto tensioner fastening unit, and engaging a bolt to the eccentrically moved auto tensioner by an auto tensioner nut runner.

In another embodiment, the method may further include, after the loading the engine on an engine jig, operating a second die toward the engine jig, and fixing the engine in a vertical direction by a fixing plate, and adjusting a phase of a crankshaft by a phase adjustment unit mounted on the second die.

According to an apparatus and a method for assembling an engine according to an exemplary embodiment, the engine assembly process may be automated, and thereby productivity may be improved.

In addition, owing to the automated engine assembly process, the number or required workers may be reduced, and inferiority rate may be minimized.

In addition, assembly deviation may be removed, and uniform assembly quality may be secured.

Other effects that may be obtained or are predicted by an exemplary embodiment are explicitly or implicitly described in a detailed description of the present disclosure. That is, various effects that are predicted according to an exemplary embodiment are described in the following detailed description.

BRIEF DESCRIPTION OF THE DRAWINGS

In order that the disclosure may be well understood, there are now described various forms thereof, given by way of example, reference being made to the accompanying drawings, in which.

Figure 1:
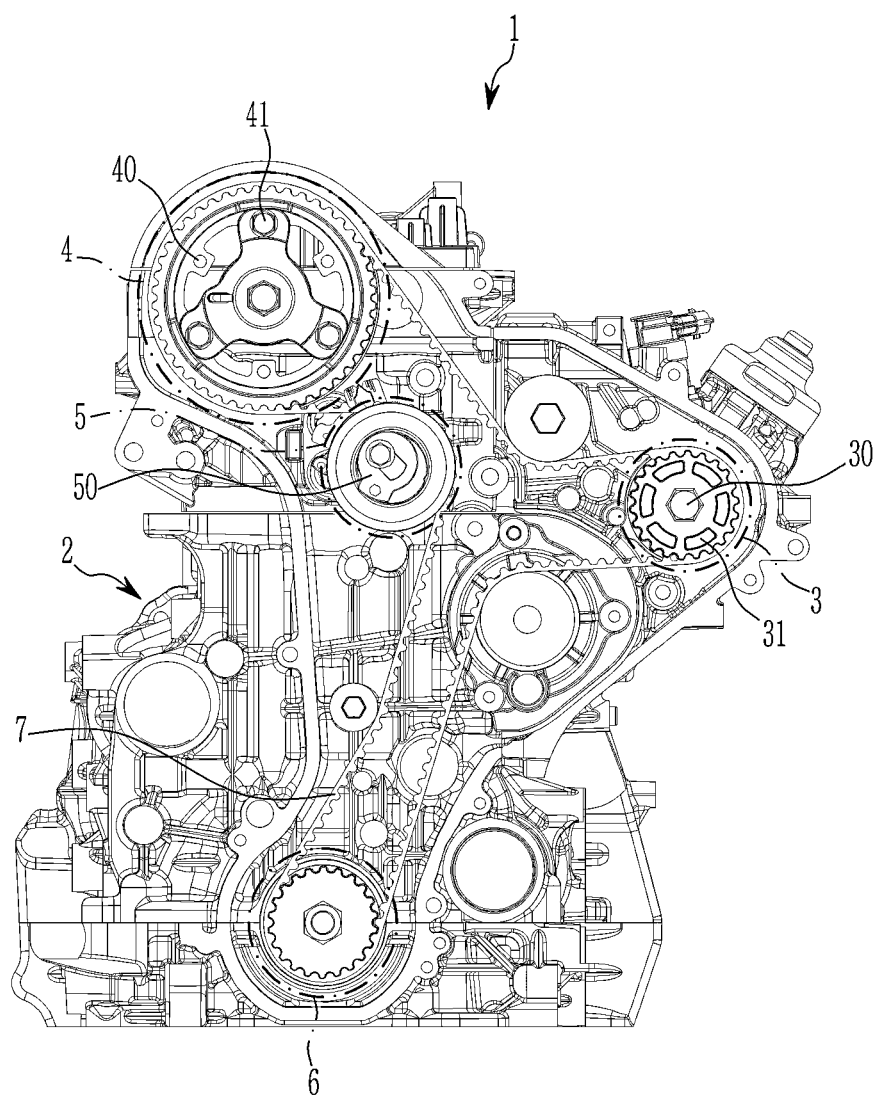
FIG. 1 is a schematic diagram of an engine module assembled by an apparatus and a method for assembling an engine according to an exemplary embodiment.

The drawings described herein are for illustration purposes only and are not intended to limit the scope of the present disclosure in any way.

DETAILED DESCRIPTION

The present disclosure is described more fully hereinafter with reference to the accompanying drawings, in which exemplary embodiments of the present disclosure are shown. As those having ordinary skill in the art would realize, the described embodiments may be modified in various different ways, all without departing from the spirit or scope of the present disclosure.

In order to clarify the present disclosure, parts that are not related to the description have been omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, in the following description, dividing names of components into first, second, and the like is to divide the names because the names of the components are the same as each other and an order thereof is not particularly limited.

In addition, unless explicitly described to the contrary, the word "comprise" and variations such as "comprises" or "comprising", should be understood to imply the inclusion of stated elements but not the exclusion of any other elements. When a component, device, element, or the like of the present disclosure is described as having a purpose or performing an operation, function, or the like, the component, device, or element should be considered herein as being "configured to" meet that purpose or to perform that operation or function.

FIG. 1 is a schematic diagram of an engine module assembled by an apparatus and a method for assembling an engine according to an exemplary embodiment.

In an engine module 1 assembled by an apparatus and a method for assembling an engine according to an exemplary embodiment, a pump sprocket 3, a cam sprocket 4, an auto tensioner 5, and a crank sprocket 6 are assembled to an engine 2.

The engine 2 is provided with a pump (not shown) connected to the pump sprocket 3.

A cam (not shown) connected to the cam sprocket 4 is installed in the engine 2.

A crankshaft 8 (refer to FIG. 2) connected to the crank sprocket 6 is installed in the engine 2.

The engine module 1 is manufactured by assembling the pump sprocket 3, the cam sprocket 4, the auto tensioner 5, and the crank sprocket 6 to the engine 2, and then assembling an engine belt 7.

The tension of the engine belt 7 should be maintained to a preset level.

In the engine module 1, the engine belt 7 is installed to the engine 2 over the pump sprocket 3, the cam sprocket 4, the auto tensioner 5, and the crank sprocket 6. Thus, the tension of the engine belt 7 may be adjusted by adjusting at least one of the pump sprocket 3, the cam sprocket 4, the auto tensioner 5, or the crank sprocket 6.

Figure 2:
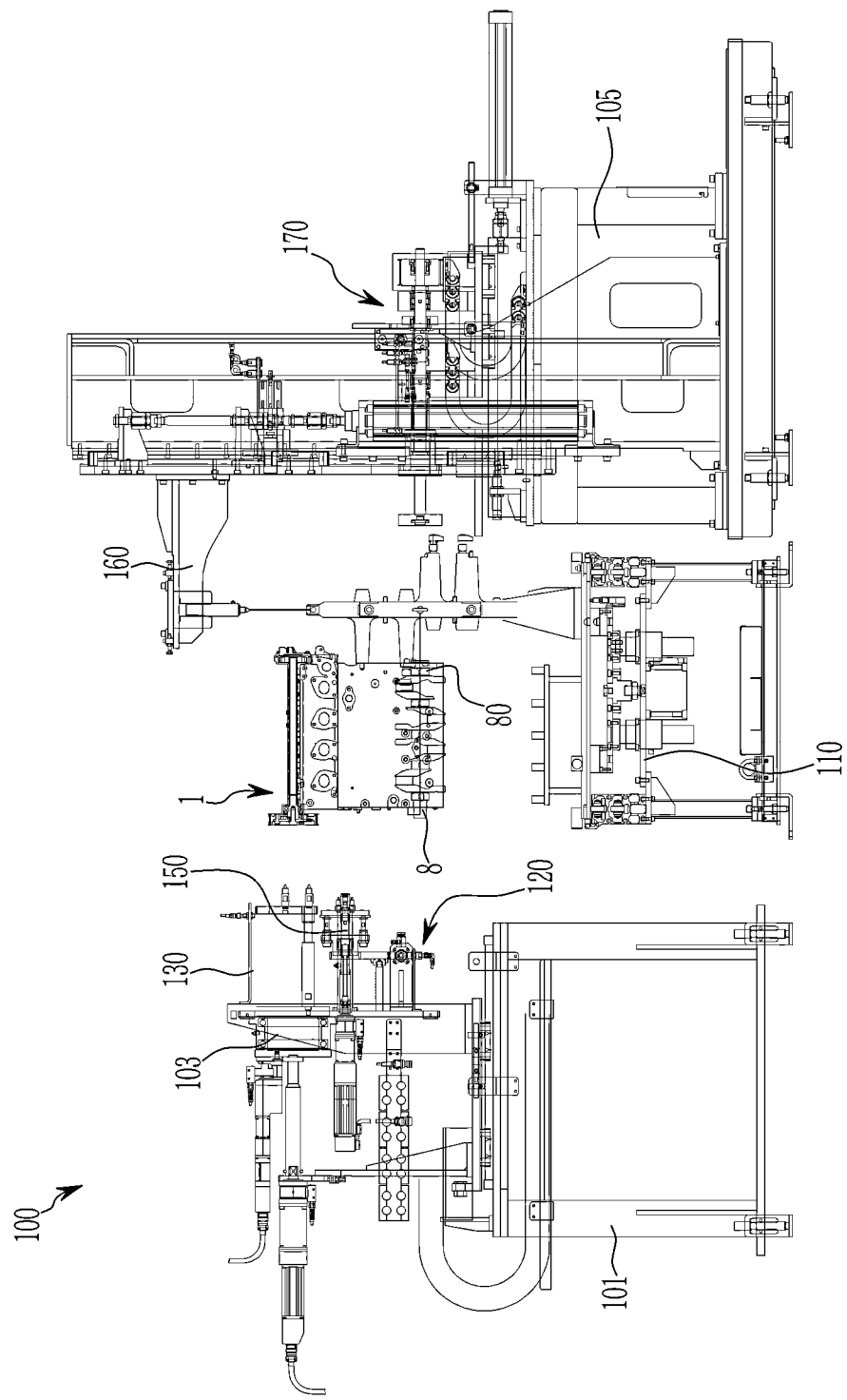
FIG. 2 is an entire schematic diagram of an apparatus for assembling an engine according to an exemplary embodiment.
Figure 3:
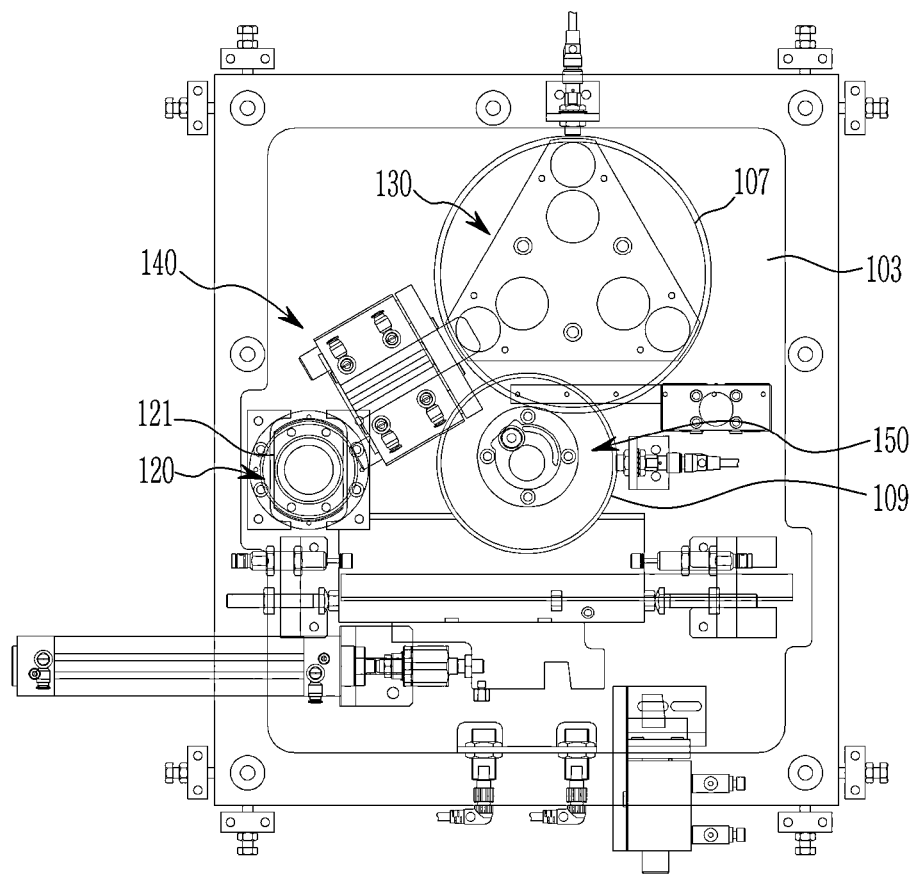
FIG. 3 is a front view of a device seated on a first die applied to an apparatus for assembling an engine according to an exemplary embodiment.

FIG. 2 is an entire schematic diagram of an apparatus for assembling an engine according to an exemplary embodiment. FIG. 3 is a front view of a device seated on a first die applied to an apparatus for assembling an engine according to an exemplary embodiment.

Referring to FIG. 2, an apparatus 100 for assembling an engine includes an engine jig 110, a pump sprocket fastening unit 120, a cam sprocket fastening unit 130, an auto tensioner fastening unit 150, a fixing plate 160, and a phase adjustment unit 170.

In the apparatus 100 for assembling an engine, the engine jig 110 is centrally positioned (i.e., arranged at the center position of the apparatus 100), a first die 101 is positioned at a first side with respect to the engine jig 110 (i.e., the left side in FIG. 2), and a second die 105 is positioned at a second side with respect to the engine jig 110 (i.e., the right side in FIG. 2). In addition, the pump sprocket fastening unit 120, the cam sprocket fastening unit 130, and the auto tensioner fastening unit 150 are arranged on the first die 101 positioned at the first side (the left side in FIG. 2). The fixing plate 160 and the phase adjustment unit 170 are arranged on the second die 105 positioned at the second side (the right side in FIG. 2).

Referring to FIG. 3, in the apparatus 100 for assembling an engine, the pump sprocket fastening unit 120, the cam sprocket fastening unit 130, the auto tensioner fastening unit 150 are disposed on the first die 101 at positions corresponding to positions of the pump sprocket 3, the cam sprocket 4, and the auto tensioner 5 mounted on the engine 2.

The engine jig 110 is loaded with the engine module 1.

The engine module 1 means the engine 2 assembled with component parts such as the pump sprocket 3, the cam sprocket 4, the auto tensioner 5, the crank sprocket 6.

When the engine module 1 is loaded on the engine jig 110, the engine module 1 is positioned such that the first die 101 faces portions of the engine 2 to which the pump sprocket 3, the cam sprocket 4, the auto tensioner 5, and the crank sprocket 6 is mounted.

Figure 4:
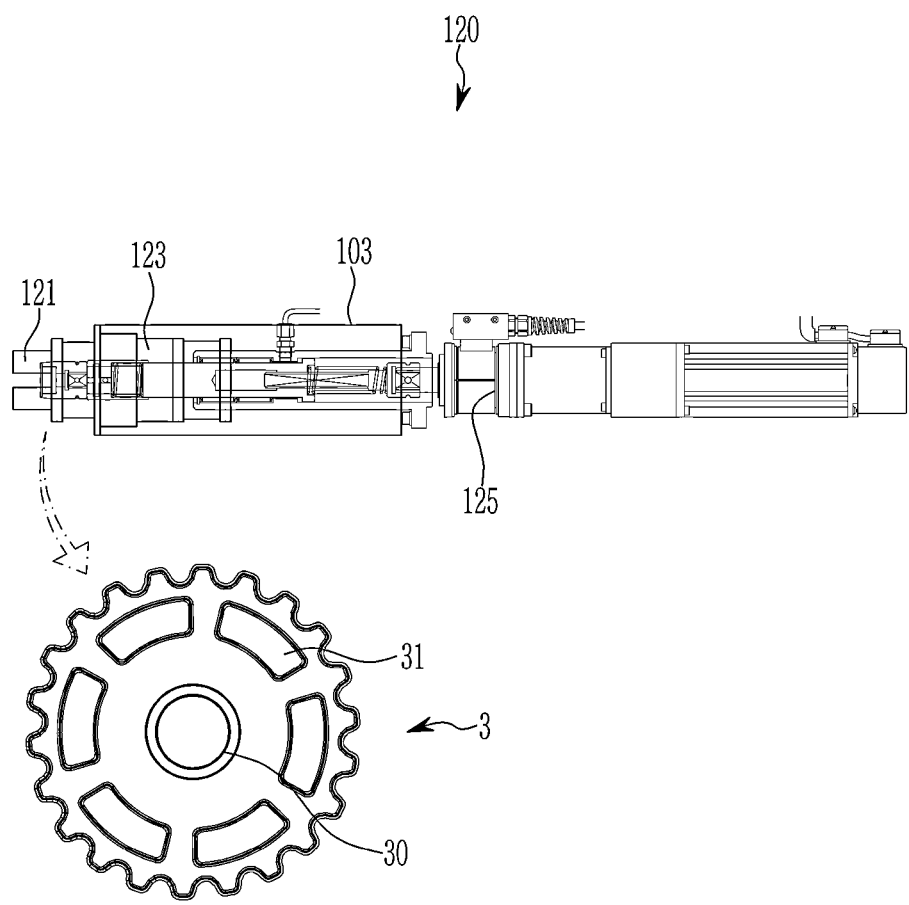
FIG. 4 is a schematic diagram of a pump sprocket fastening unit applied to an apparatus for assembling an engine according to an exemplary embodiment.

FIG. 4 is a schematic diagram of a pump sprocket fastening unit applied to an apparatus for assembling an engine according to an exemplary embodiment.

Referring to FIG. 4, the pump sprocket fastening unit 120 is configured on the first die 101 disposed on a first side of the engine jig 110.

The pump sprocket fastening unit 120 clamps and fully fastens the pump sprocket 3 in order to fixedly mount the pump sprocket 3 preliminarily mounted to the engine 2.

For such a purpose, the pump sprocket fastening unit 120 includes a slot head 121 and the pump sprocket nut runner 125.

A bolt hole 30 is formed at a central portion of the pump sprocket 3, and a plurality of slots 31 are formed at a preset interval along a circumference of the bolt hole 30.

The slot head 121 may be mounted on a first housing 103 fixed to the first die 101.

The slot head 121 may be mounted on the first housing 103 through a first cushion member 123.

At this time, the first cushion member 123 provides a damper function by being compressed when connected to the pump sprocket 3.

The slot head 121 may fix the pump sprocket 3 by being inserted into the slot 31 formed on the pump sprocket 3.

The slot head 121 may be circumferentially arranged, corresponding to the shapes of the slots 31.

The pump sprocket nut runner 125 is configured on an axis of the slot head 121.

The pump sprocket nut runner 125 is fixed to the first die 101.

The pump sprocket nut runner 125 is configured to engage a bolt to the bolt hole 30 formed in a central portion of the pump sprocket 3.

Figure 5:
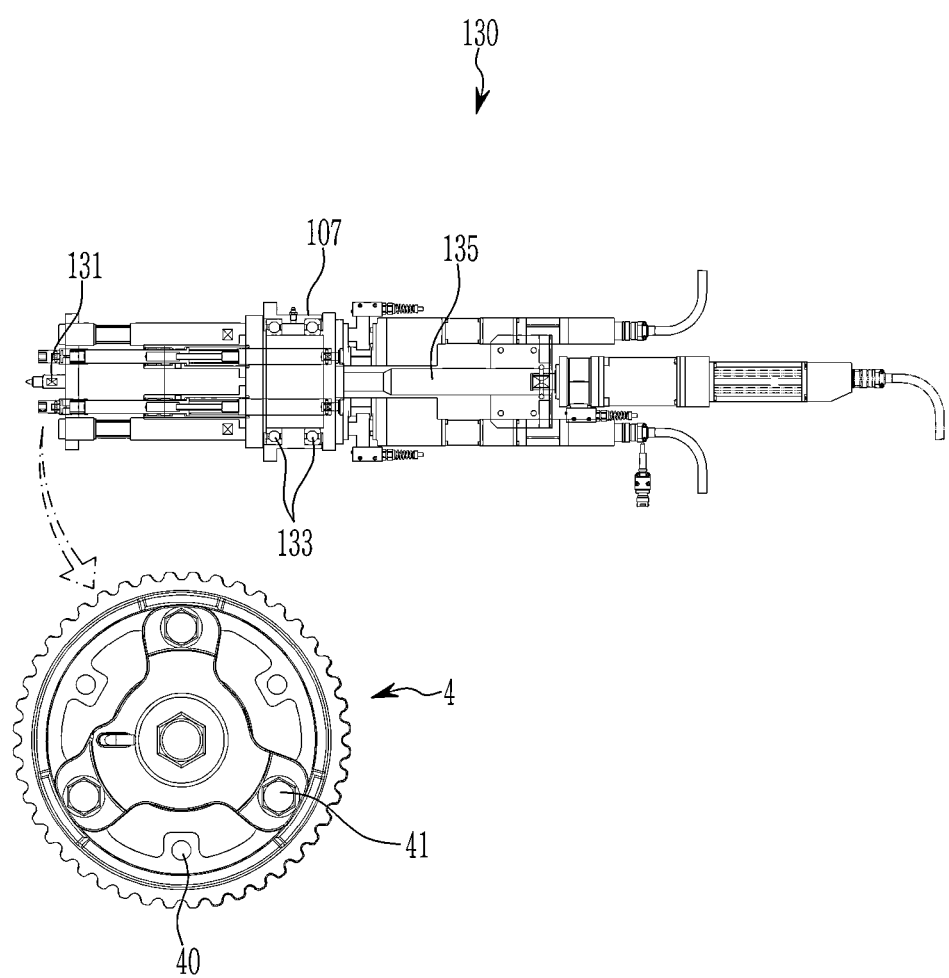
FIG. 5 is a schematic diagram of a cam sprocket fastening unit applied to an apparatus for assembling an engine according to an exemplary embodiment.

FIG. 5 is a schematic diagram of a cam sprocket fastening unit applied to an apparatus for assembling an engine according to an exemplary embodiment.

Referring to FIG. 5, the cam sprocket fastening unit 130 is configured on the first die 101.

The cam sprocket fastening unit 130 clamps, rotates, and fully fastens the cam sprocket 4 in order to fixedly mount the cam sprocket 4 preliminarily mounted to the engine 2.

For such a purpose, the cam sprocket fastening unit 130 includes a tool head 131 and a cam sprocket nut runner 135.

A plurality of tool holes 40 are formed around the center of the cam sprocket 4, and a plurality of fastening holes 41 are formed alternatingly with respect to the plurality of tool holes 40.

For example, with respect to a preliminary mounting direction, the plurality of tool holes 40 may be arranged in a triangle shape, and the plurality of fastening holes 41 may be arranged in an inverted triangle shape.

The tool head 131 is mounted on a second housing 107 fixed to the first die 101.

The tool head 131 may be rotatably mounted on the second housing 107 through a ball bearing 133.

The tool head 131 is capable of being inserted into the plurality of tool holes 40 formed in the cam sprocket 4 at a preset interval.

The cam sprocket nut runner 135 is disposed to be positioned between the plurality of tool holes 40.

The cam sprocket nut runner 135 is configured to engage a bolt to the fastening hole 41.

The cam sprocket nut runner 135 may be fixed to the first die 101.

A cam sprocket locking unit 140 is disposed adjacent to the cam sprocket fastening unit 130.

The cam sprocket locking unit 140 is configured to lock the cam sprocket 4 loaded to the cam sprocket fastening unit 130.

The cam sprocket locking unit 140 is mounted on the first die 101.

The cam sprocket locking unit 140 is configured to pressurize and fix the cam sprocket 4.

Figure 6:
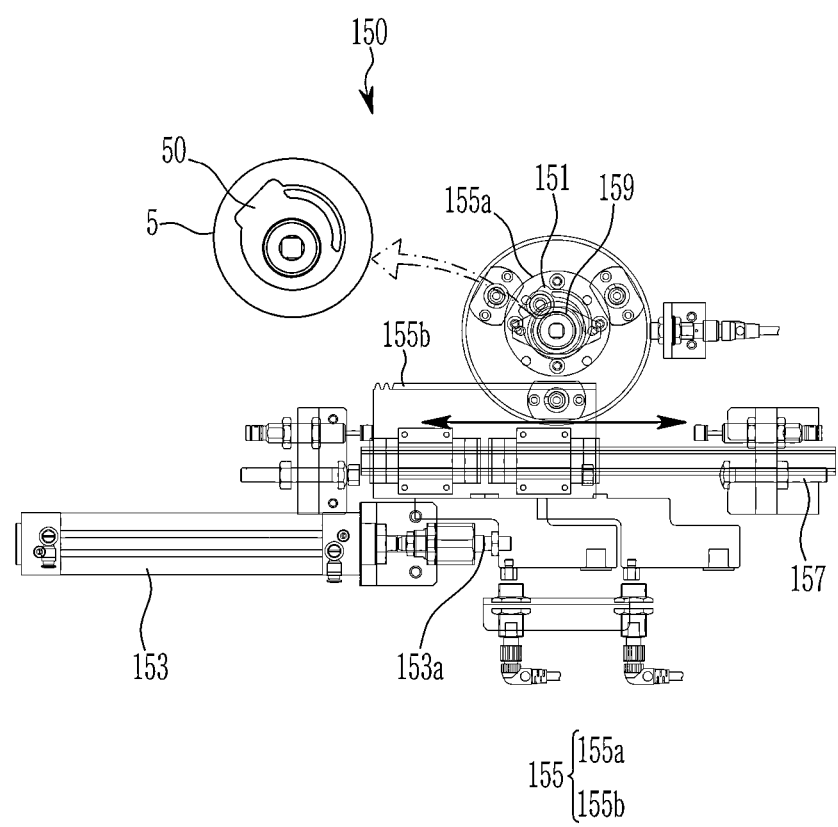
FIG. 6 is a schematic diagram of an auto tensioner fastening unit applied to an apparatus for assembling an engine according to an exemplary embodiment.

FIG. 6 is a schematic diagram of an auto tensioner fastening unit applied to an apparatus for assembling an engine according to an exemplary embodiment.

Referring to FIG. 6, the auto tensioner fastening unit 150 is configured on the first die 101.

The auto tensioner fastening unit 150 clamps, rotates, and fully fastens the auto tensioner 5 in order to fixedly mount the auto tensioner 5 preliminarily mounted to the engine 2.

For such a purpose, the auto tensioner fastening unit 150 includes an eccentric portion 151 and an auto tensioner nut runner 159.

The auto tensioner 5 includes an eccentric pin 50, and the eccentric pin 50 may be fixed by a bolt.

The eccentric portion 151 is mounted on a third housing 109 fixed to the first die 101.

The eccentric portion 151 is configured to contact an exterior surface of the eccentric pin 50 of the auto tensioner 5, and the eccentric portion 151 eccentrically moves the eccentric pin 50.

The eccentric portion 151 is connected to a gear portion 155 operated by a cylinder 153, and operation amount of the eccentric portion 151 may be adjusted by a stopper 157 configured on a frontal end of the gear portion 155.

At this time, the gear portion 155 includes a pinion gear 155*a* engaged to the eccentric portion 151.

In addition, the gear portion 155 also includes a rack gear 155*b* connected to the pinion gear 155*a* and an operation shaft 153*a* of the cylinder 153.

The rack gear 155*b* is configured to rotate the pinion gear 155*a* by the operation of the cylinder 153, and the stopper 157 may be disposed adjacent to an end of the rack gear 155*b*.

The eccentrically moved auto tensioner 5 may be bolted to the engine 2 by using the auto tensioner nut runner 159.

In addition, the fixing plate 160 is configured on the second die 105 disposed on a second side of the engine jig 110 (refer to FIG. 2).

The fixing plate 160 operates in a vertical direction.

The fixing plate 160 is configured to fix the engine 2 in the vertical direction when the engine 2 is loaded to the engine jig 110.

At this time, by the fixing plate 160, the engine module 1 loaded on the engine jig 110 may be fixedly held in a horizontal direction.

Figure 7:
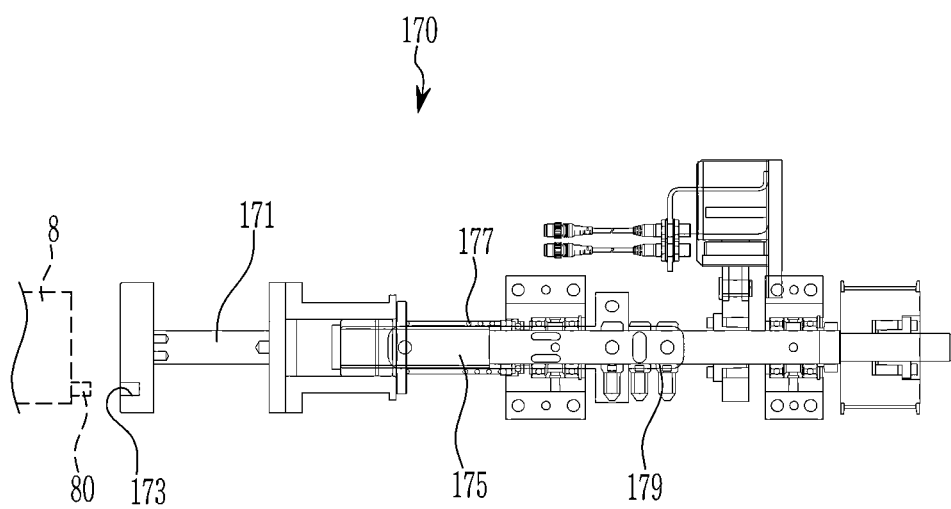
FIG. 7 is a schematic diagram of a phase adjustment unit applied to an apparatus for assembling an engine according to an exemplary embodiment.

FIG. 7 is a schematic diagram of a phase adjustment unit applied to an apparatus for assembling an engine according to an exemplary embodiment.

Referring to FIG. 7, the phase adjustment unit 170 is disposed below the fixing plate 160 and mounted on the second die 105.

The phase adjustment unit 170 is configured to adjust the phase of the crankshaft 8 disposed on a lower side of the engine 2.

The phase adjustment unit 170 includes a crank head 171, a second cushion member 177, and a position detection sensor 179.

The crank head 171 is rotatably mounted on the third housing 109 fixed to the second die 105 through a rotation shaft 175.

The crank head 171 may be connected to a crank pin 80 of the crankshaft 8.

At this time, a pin receiving recess 173 configured to receive the crank pin 80 may be formed in the crank head 171.

The second cushion member 177 is connected to a frontal end of the crank head 171.

The second cushion member 177 is fitted with the rotation shaft 175, and configured to be compressed when the crank head 171 is connected to the crankshaft 8.

The position detection sensor 179 is mounted on the rotation shaft 175.

The position detection sensor 179 is employed to check a position of the crankshaft 8.

In one embodiment, when the phase adjustment of the crankshaft 8 is finished by the crank head 171 contacting the crankshaft 8, the position of the crankshaft 8 may be checked by the position detection sensor 179.

The engine 2 may be assembled by the apparatus 100 for assembling an engine as follows.

Figure 8:
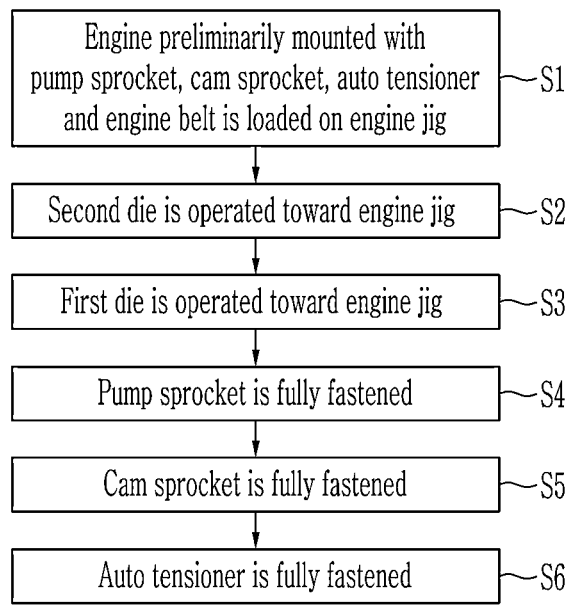
FIG. 8 is a flowchart showing a method for assembling an engine according to an exemplary embodiment.

FIG. 8 is a flowchart showing a method for assembling an engine according to an exemplary embodiment.

Referring to FIG. 8, at step S1, the engine 2 preliminarily mounted with the pump sprocket 3, the cam sprocket 4, and the auto tensioner 5 is loaded on the engine jig 110.

At step S2, the second die 105 is operated toward the engine jig 110.

The fixing plate 160 is operated downward, and the engine 2 is fixed in the vertical direction.

The phase of the crankshaft 8 is adjusted by the phase adjustment unit 170 mounted on the second die 105.

Subsequently, at step S3, the first die 101 is operated forward toward the engine jig 110. Accordingly, the pump sprocket fastening unit 120 is connected to the pump sprocket 3, the cam sprocket fastening unit 130 is connected to the cam sprocket 4, and the auto tensioner fastening unit 150 is connected to the auto tensioner 5.

At step S4, the pump sprocket 3 is fully fastened by the pump sprocket fastening unit 120.

In more detail, the pump sprocket is fixed by insertion of the slot head 121 of the pump sprocket fastening unit 120 into the slot 31 of the pump sprocket 3, while the first cushion member 123 of the pump sprocket fastening unit 120 is being compressed.

Then, a bolt is engaged with the bolt hole 30 of the pump sprocket 3 by the pump sprocket nut runner 125.

Subsequently, at step S5, the cam sprocket 4 is fully fastened by the cam sprocket fastening unit 130.

In more detail, the cam sprocket 4 is rotated to a preset angle by the tool head 131 of the cam sprocket fastening unit 130 inserted into the tool hole 40 of the cam sprocket 4.

Then, a bolt is engaged with the fastening hole 41 of the cam sprocket 4 by the cam sprocket nut runner 135.

Here, a preset tension may be applied to a first side of the engine belt 7 when the cam sprocket 4 is rotated in a preset direction (e.g., clockwise).

Finally, at step S6, the auto tensioner 5 is fully fastened by the auto tensioner fastening unit 150.

In more detail, the eccentric pin 50 is eccentrically moved by a preset angle by the exterior surface of the eccentric pin 50 of the auto tensioner 5 contacting the eccentric portion 151 of the auto tensioner fastening unit 150.

Then, a bolt is engaged with the eccentrically moved auto tensioner 5 by the auto tensioner nut runner 159.

Here, a preset tension may be applied to a second side of the engine belt 7 when the eccentric pin 50 of the auto tensioner 5 is eccentrically mounted by a preset amount.

Therefore, according to an apparatus and a method for assembling an engine according to an exemplary embodiment, the engine assembly process may be automated, and thereby productivity may be improved.

In addition, according to an apparatus and a method for assembling an engine according to an exemplary embodiment, owing to the automated engine assembly process, the number or required workers may be reduced, and inferiority rate may be minimized.

Accordingly, according to an apparatus and a method for assembling an engine according to an exemplary embodiment, assembly deviation may be removed, and uniform assembly quality may be secured.

While the present disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the present disclosure.

DESCRIPTION OF SYMBOLS

| | |
|---|---|
| 1: engine module | 2: engine |
| 3: the pump sprocket | 30: bolt hole |
| 31: slot | 4: cam sprocket |
| 40: tool hole | 41: engagement hole |
| 5: auto tensioner | 50: eccentric pin |
| 6: crank sprocket | 7: engine belt |
| 8: crankshaft | 80: crank pin |
| 100: apparatus for assembling engine | |
| 101: first die | |
| 103: first housing | 105: second die |
| 107: second housing | 109: third housing |
| 110: engine jig | |
| 120: the pump sprocket fastening unit | |
| 121: slot head | 123: first cushion member |
| 125: the pump sprocket nut runner | 130: cam sprocket fastening unit |
| 131: tool head | 133: ball bearing |
| 135: cam sprocket nut runner | 140: cam sprocket locking unit |
| 150: auto tensioner fastening unit | 151: eccentric portion |
| 153: cylinder | 153a: operation shaft |
| 155: gear portion | 155a: pinion gear |
| 155b: rack gear | 157: stopper |
| 159: auto tensioner nut runner | 160: fixing plate |
| 170: phase adjustment unit | 171: crank head |
| 173: pin receiving recess | 175: rotation shaft |
| 177: second cushion member | 179: sensor |

What is claimed is:

1. An apparatus for assembling an engine, the apparatus comprising:
    an engine jig configured to support the engine, the engine including a pump sprocket, a cam sprocket, an auto tensioner, and an engine belt each preliminarily mounted to the engine; and
    a first die disposed on a first side of the engine jig, the first die including:
        a pump sprocket fastening unit configured to clamp and fully fasten the pump sprocket to the engine;
        a cam sprocket fastening unit configured to clamp, rotate, and fully fasten the cam sprocket to the engine; and
        an auto tensioner fastening unit configured to clamp, rotate, and fully fasten the auto tensioner to the engine.

2. The apparatus of claim 1, wherein the pump sprocket fastening unit comprises:
    a first housing fixed to the first die, the first housing including a slot head configured to engage a slot formed on the pump sprocket; and
    a pump sprocket nut runner fixed to the first die, the pump sprocket nut runner configured to thread a bolt into a bolt hole formed in a central portion of the pump sprocket.

3. The apparatus of claim 2, wherein:
    the slot head is mounted on the first housing through a first cushion member; and
    the first cushion member is compressed when the slot head engages the slot of the pump sprocket.

4. The apparatus of claim 2, the first die further includes:
    a cam sprocket locking unit configured to pressurize and fix a rotational position of the cam sprocket.

5. The apparatus of claim 1, wherein the cam sprocket fastening unit comprises:
    a second housing fixed to the first die, the second housing including a tool head configured to engage a plurality of tool holes formed in the cam sprocket; and
    a cam sprocket nut runner configured to thread a plurality of bolts into a corresponding plurality of fastening holes formed in the cam sprocket,
    wherein the plurality of tool holes and the plurality of fastening holes are arranged so as to alternate in a circumferential array about the cam sprocket.

6. The apparatus of claim 5, wherein the tool head is rotatably mounted on the second housing via a ball bearing.

7. The apparatus of claim 1, wherein the auto tensioner fastening unit comprises:
    a third housing fixed to the first die, the third housing including an eccentric portion configured to engage an exterior surface of an eccentric pin of the auto tensioner so as to eccentrically move the auto tensioner via the eccentric pin; and
    an auto tensioner nut runner configured to thread a bolt into the eccentrically moved auto tensioner.

8. The apparatus of claim 7, wherein the auto tensioner fastening unit further comprises:
    a gear portion engaging the eccentric portion, the gear portion actuated via a cylinder, and
    a stopper arranged on a front end of the gear portion so as to adjust an operation amount of the eccentric portion.

9. The apparatus of claim 8, wherein the gear portion comprises:
    a pinion gear coupled to the eccentric portion; and
    a rack gear meshed with the pinion gear, the rack gear connected to an operation shaft of the cylinder so as to rotate the pinion gear when actuated via the cylinder.

10. The apparatus of claim 1, further comprising:
    a cam sprocket locking unit disposed adjacent to the cam sprocket fastening unit, the cam sprocket locking unit configured to lock a rotational position of the cam sprocket as the cam sprocket fastening unit fully fastens the cam sprocket.

11. The apparatus of claim 1, further comprising:
a second die disposed on a second side of the engine jig, the second die including a fixing plate configured to fix the engine in a vertical direction when the engine is loaded to the engine jig.

12. The apparatus of claim 11, wherein the second die further includes:
a phase adjustment unit disposed below the fixing plate, the phase adjustment unit configured to adjust a phase of a crankshaft disposed on a lower side of the engine.

13. The apparatus of claim 12, wherein the phase adjustment unit comprises:
a third housing fixed to the second die, the third housing rotatably supporting a crank head via a rotation shaft, the crank head configured to engage a crank pin of the crankshaft;
a second cushion member fitted on the rotation shaft and connected to the crank head, the second cushion member configured to be compressed when the crank head engages the crankshaft; and
a position detection sensor mounted on the rotation shaft, the position detection sensor configured to detect a rotational position of the crankshaft.

14. The apparatus of claim 13, wherein the crank head includes a pin receiving recess configured to receive the crank pin.

15. A method for assembling an engine, the method comprising:
preliminarily mounting a pump sprocket, a cam sprocket, an auto tensioner, and an engine belt on the engine;
loading the engine on an engine jig; and
actuating a first die toward the engine loaded on the engine jig such that:
a pump sprocket fastening unit connects to the pump sprocket so as to fully fasten the pump sprocket to the engine,
a cam sprocket fastening unit connects to the cam sprocket so as to fully fasten the cam sprocket to the engine, and
an auto tensioner fastening unit connects to the auto tensioner so as to fully fasten the auto tensioner to the engine.

16. The method of claim 15, wherein the full fastening of the pump sprocket comprises:
inserting a slot head of the pump sprocket fastening unit into a slot of the pump sprocket so as to compress a first cushion member of the pump sprocket fastening unit and fix a rotational position of the pump sprocket; and
threading a bolt into a bolt hole of the pump sprocket via a pump sprocket nut runner.

17. The method of claim 15, wherein the full fastening of the cam sprocket comprises:
inserting a tool head of the cam sprocket fastening unit into a tool hole of the cam sprocket so as to rotate the cam sprocket to a preset angle; and
threading a bolt into a fastening hole of the cam sprocket via a cam sprocket nut runner.

18. The method of claim 15, wherein the full fastening of the auto tensioner comprises:
contacting an exterior surface of an eccentric pin of the auto tensioner via an eccentric portion of the auto tensioner fastening unit so as to eccentrically move the auto tensioner to a preset angle via the eccentric pin; and
threading a bolt into the eccentrically moved auto tensioner by an auto tensioner nut runner.

19. The method of claim 15, further comprising:
actuating a second die toward the engine loaded on the engine jig such that:
a fixing plate fixes the engine in a vertical direction; and
a phase adjustment unit adjusts a phase of a crankshaft of the engine.

* * * * *